(12) United States Patent
Nakamura (10) Patent No.: US 8,919,398 B2
(45) Date of Patent: Dec. 30, 2014

(54) PNEUMATIC TIRE FOR TWO-WHEELED VEHICLE

(75) Inventor: Ichizou Nakamura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1022 days.

(21) Appl. No.: 13/054,419

(22) PCT Filed: Jul. 14, 2009

(86) PCT No.: PCT/JP2009/062753

§ 371 (c)(1),
(2), (4) Date: Jan. 14, 2011

(87) PCT Pub. No.: WO2010/007994

PCT Pub. Date: Jan. 21, 2010

(65) Prior Publication Data

US 2011/0120605 A1    May 26, 2011

(30) Foreign Application Priority Data

Jul. 16, 2008 (JP) ................................. 2008-185133

(51) Int. Cl.
*B60C 11/11* (2006.01)
*B60C 11/13* (2006.01)
*B60C 11/03* (2006.01)

(52) U.S. Cl.
CPC ............. *B60C 11/11* (2013.01); *B60C 11/1315* (2013.04); *B60C 11/0316* (2013.04); *B60C 11/13* (2013.01); *B60C 11/1392* (2013.04); *B60C 2200/10* (2013.04); *B60C 2200/14* (2013.04)
USPC ............. 152/209.12; 152/209.15; 152/209.24

(58) Field of Classification Search
USPC ............... 152/209.1, 209.12, 209.13, 209.15, 152/209.21, 209.23, 209.24
See application file for complete search history.

(56) References Cited

U.S. PATENT DOCUMENTS 6,604,564 B1 * 8/2003 Thiebaud ................. 152/209.21
6,866,076 B2 * 3/2005 Ohsawa .................... 152/209.21

(Continued)

FOREIGN PATENT DOCUMENTS

EP    1 580 033 A1    9/2005
JP    61-143206    *  6/1986

(Continued)

OTHER PUBLICATIONS

English machine translation of JP10-181313, dated Jul. 1998.*

(Continued)

*Primary Examiner* — Justin Fischer
*Assistant Examiner* — Robert Dye
(74) *Attorney, Agent, or Firm* — Sughrue Mion, PLLC (57) ABSTRACT

A center block and a second block that satisfy $h_1/H=0.05$ to 0.4 and $w_1/W=0.05$ to 0.4 are formed on a tread, where H is the block height, $h_1$ is the drop in height of a chamfered part, $w_1$ is the breadth of the chamfered part and W is the length of the block tread in a circumferential direction. When traveling on hard pavement, the chamfered part of the block contacts the hard pavement first and, compared to a case in which an edge that does not have a chamfered part contacts a hard pavement, the ground-contact surface area can be increased and steering stability on hard pavement can be improved. Further, in rough terrain, resistance received from a road surface at the time of ground contact is reduced, travel resistance is suppressed and steering stability is improved.

6 Claims, 6 Drawing Sheets

(56) References Cited

U.S. PATENT DOCUMENTS

| | | | |
|---|---|---|---|
| 6,910,512 B1 * | 6/2005 | Takahashi | 152/209.15 |
| 2002/0112800 A1 | 8/2002 | Suzuki et al. | |

FOREIGN PATENT DOCUMENTS

| JP | 02-141310 A | | 5/1990 |
|---|---|---|---|
| JP | 02-293205 | * | 12/1990 |
| JP | 03-112703 A | | 5/1991 |
| JP | 3-186405 A | | 8/1991 |
| JP | 10-181313 | * | 7/1998 |
| JP | 11-078427 | * | 3/1999 |
| JP | 2001-219715 A | | 8/2001 |
| JP | 2003-267003 A | | 9/2003 |
| JP | 2004-306843 A | | 11/2004 |
| JP | 2004-351956 A | | 12/2004 |
| JP | 2005-289092 | * | 10/2005 |
| JP | 2007-131111 | * | 5/2007 |

OTHER PUBLICATIONS

English machine translation of JP2005-289092, dated Oct. 2005.*
English machine translation of JP2004-351956, dated Dec. 2004.*
English machine translation of JP2007-131111, dated May 2007.*
International Search Report of PCT/JP2009/062753 dated Sep. 15, 2009.
Extended European Search Report, dated Feb. 11, 2014, issued in corresponding European Patent Application No. 09797919.9.
M604: "Bridgestone Offroad 09", motorrad-testbericht.at, Jan. 21, 2010, retrieved from the Internet: URL:http://motorrad-testbericht.at/magazin/bridgestone/offroad_09/m604.jpg [retrieved on Jan. 10, 2014].

* cited by examiner

PNEUMATIC TIRE FOR TWO-WHEELED VEHICLE

TECHNICAL FIELD

The present invention relates to a pneumatic tire for a two-wheeled vehicle and, in particular, to a pneumatic tire for a two-wheeled vehicle that is suitable for travel on rough terrain.

BACKGROUND ART

Two-wheeled vehicles that travel on rough terrain including muddy ground use pneumatic tires for two-wheeled vehicles that are provided with plural blocks at the tire tread in order to obtain grip in rough terrain or the like (see, for example, Japanese Patent Application Laid-open (JP-A) No. 2004-306843).

DISCLOSURE OF INVENTION

Technical Problem

In block patterns for rough terrain, it is necessary to increase the size of the blocks in order to improve the grip sensation and the grounding sensation by increasing the ground-contact surface area.

Further, in order to improve the grip sensation, the grounding sensation, and overall control due to the edge effect, it is necessary to make the angle of the block wall surfaces close to the direction normal to the tread surface.

However, increasing the size of the block is problematic in that the negative rate (negative camber) of the tire decreases and the grounding pressure effect of the block also decreases, whereby the edge effect is simultaneously reduced.

Further, making the angle of the block wall surfaces close to the direction normal to the tread surface is problematic in that tire rigidity is reduced and sufficient grip sensation and grounding sensation cannot be obtained.

Further, increasing the hardness of the rubber used in the block in order to ensure block rigidity is problematic in that while block rigidity and the edge effect of the block are increased, grip cannot be obtained at the block surface because the mobility of the block surface is reduced at the same time.

In a pneumatic tire for a two-wheeled vehicle provided with a block pattern for rough terrain equipped with plural blocks on the tread, it is necessary to raise the block rigidity for the purpose of digging in, in order to increase the grip sensation and the grounding sensation. In order to raise the block rigidity, it is necessary to either increase the size of the block itself or increase the hardness of the rubber used.

When the size of the block itself is increased, grip cannot be secured at the block surface on fastened pavement or hard pavement that prevents the block edge from digging into the road surface, because the mobility of the block surface is reduced. Here, while one option would be to reduce the hardness of the rubber for the purpose of improving the grip at the block grounding surface, this is problematic in that even if the steering stability is improved by the flexibility of the rubber, edge wear is accelerated.

Further, when the size of the block itself is increased, since the negative rate (camber) is reduced in conjunction with the increased surface area of the block, block grounding pressure is reduced and a sufficient edge digging-in effect cannot be expected on muddy ground and soft pavement.

If the angle of the block wall surfaces is made close to the direction normal to the tread surface for the purpose of improving steering stability according to the block edge effect, while the edge effect itself is improved, block rigidity is reduced at the same time and an improvement in steering stability due to the edges cannot be sufficiently realized.

In view of these problems, improvements in steering stability for rough terrain travel in terms of grip sensation, grounding sensation and overall control are commercially desired.

Further, since two-wheeled vehicles that are fitted with pneumatic tires for a two-wheeled vehicle provided with a block pattern do not only travel on rough terrain, but also travel on general hard pavements such as asphalt or concrete road surfaces, it is necessary to also ensure sufficient performance for traveling on hard pavement, and improvements in steering stability on hard pavement that also focus on rough terrain travel are commercially desired.

The present invention was formed to address the above problems, and aims to provide a pneumatic tire for a two-wheeled vehicle that ensures basic rough terrain traveling performance while also improving steering stability on rough terrain road surfaces and, in addition, can improve steering stability on hard pavement.

Solution to Problem

A pneumatic tire for a two-wheeled vehicle according to a first aspect of the present invention includes plural blocks provided on a tread, where the plural blocks include a chamfered block that has a chamfered part formed at a block tread side edge portion at a leading side and that satisfies $h1/H=0.05$ to $0.4$ and $w1/W=0.05$ to $0.4$ when H is block height, MP1 is an edge of the chamfered part at an inner side in a tire radial direction, MP2 is an edge portion of the chamfered part at the block tread side, h1 is a distance measured along a direction normal to the tread surface from a highest part of the block tread to the tire radial direction inner side edge MP1 of the chamfered part, KP is a trailing edge of the block tread, W is a distance measured along a tire circumferential direction from the tire radial direction inner side edge MP1 to the trailing edge KP, and w1 is the distance measured along the tire circumferential direction from the tire radial direction inner side edge MP1 to the block tread side edge portion MP2.

Next, the mechanism of the pneumatic tire for a two-wheeled vehicle according to the first aspect of the present invention is explained.

In the pneumatic tire for a two-wheeled vehicle according to the first aspect of the present invention, plural blocks are formed on the tread; that is, since the tread pattern is a block pattern, the tire has basic rough terrain traveling capability for traveling in rough terrain including muddy ground.

Further, because a chamfered part that satisfies $h1/H=0.05$ to $0.4$ and $w1/W=0.05$ to $0.4$ is formed at a block tread side edge portion at a leading side of the chamfered block, on muddy ground and soft pavement, resistance received from a road surface when the chamfered block is grounded on the road surface can be reduced, traveling resistance on rough terrain is reduced, and steering stability on rough terrain can be improved.

In addition, when the chamfered block is positioned directly beneath the tire axis of rotation and contacts a flat hard pavement, the chamfered portion does not contact the road surface.

Further, when the chamfered block that has a chamfered part that satisfies $h1/H=0.05$ to $0.4$ and $w1/W=0.05$ to $0.4$ formed at a block tread side edge portion at a leading side travels on hard pavement that prevents the block edge from digging into the road surface such as asphalt or concrete road surfaces, the chamfered part first contacts the hard pavement and, compared to a case in which an edge that is not provided with a chamfered part contacts hard pavement, the ground contact surface area when the block is grounded can be increased. As a result, grip can be improved on hard pavement and steering stability on hard pavement can be improved.

In addition, at least one row of blocks having chamfered blocks, which are provided with a chamfered part that satisfies h1/H=0.05 to 0.4 and w1/W=0.05 to 0.4, arranged in a tire circumferential direction is preferably provided at the tread and, further, is preferably provided at a central part in the tread width direction.

When h1/H is less than 0.05, sufficient ground-contact surface area for the chamfered part that initially contacts the hard pavement cannot be secured, and the grip on hard pavement cannot be improved compared to the conventional art. Further, it is not possible to suppress travel resistance when traveling on rough terrain.

On the other hand, when h1/H is more than 0.4, the effect of the groove angle at the block leading side becomes larger than that of the chamfered part. Further, in order for that surface to effectively contact the ground, it is necessary for the block to contact the ground from when it is in a location further ahead in the direction of travel than directly under the load, such that the tire radius or the yield (deflection) amount directly under the load must be increased compared to a conventional tire, which cannot be said to be an effective means for improving steering stability.

Further, when w1/W is less than 0.05, sufficient ground-contact surface area for the chamfered part that initially contacts the hard pavement cannot be secured, and the grip on hard pavement cannot be improved compared to the conventional art. Further, it is not possible to suppress travel resistance when traveling on rough terrain.

On the other hand, when w1/W is more than 0.4, it becomes impossible to secure the ground-contact surface area necessary to exhibit grip within the ground-contact surface, and the required grip cannot be obtained.

Accordingly, in the present invention, it is necessary that h1/H=0.05 to 0.4 and w1/W=0.05 to 0.4.

In a second aspect of the present invention, in the pneumatic tire for a two-wheeled vehicle of the first aspect, the block tread of the chamfered block includes a slightly-inclined surface whereby the block height gradually decreases toward the trailing edge side and, when the chamfered block is positioned directly under an axis of tire rotation and contacts a flat road surface, an entire surface of the slightly-inclined surface contacts the flat road surface.

Next, the mechanism of the pneumatic tire for a two-wheeled vehicle according to the second aspect of the present invention is explained.

In the pneumatic tire for a two-wheeled vehicle according to the second aspect of the present invention, a slightly-inclined surface is provided at the block tread of the chamfered block such that the block height gradually decreases toward the trailing edge side, as a result of which, when traveling on hard pavement, the timing at which the block tread separates from the road surface is delayed, and the ground-contact surface area at the time of kick-off can be increased, as compared to a block tread that is not provided with a slightly-inclined surface. As a result, the grip sensation and the grounding sensation on hard pavement can be improved.

In a third aspect of the present invention, in the pneumatic tire for a two-wheeled vehicle of the second aspect, the slightly-inclined surface has an arc shape that is convex toward an outer side in the tire radial direction as seen in sectional view along the block circumferential direction.

Next, the mechanism of the pneumatic tire for a two-wheeled vehicle according to the third aspect of the present invention is explained.

In the pneumatic tire for a two-wheeled vehicle according to the third aspect of the present invention, the slightly-inclined surface has an arc shape that is convex toward an outer side in the tire radial direction as seen in sectional view along the circumferential direction, as a result of which there are no drastic changes in the grounding pressure of the block tread along the circumferential direction, and a preferable tread configuration is thus achieved.

In a fourth aspect of the present invention, in the pneumatic tire for a two-wheeled vehicle of the second or third aspect, h2/H=0.05 to 0.2 when h2 is a distance measured along a direction normal to the tread surface from the highest part of the block tread to the trailing edge KP.

Next, the mechanism of the pneumatic tire for a two-wheeled vehicle according to the fourth aspect of the present invention is explained.

When h2/H is less than 0.05, it is not possible to delay the timing at which the block tread separates from the road surface on hard pavement compared with a block tread that is not inclined, and the grip sensation and grounding sensation on hard pavement cannot be increased.

On the other hand, when h2/H is more than 0.2, a portion is created at the trailing edge side of the block tread that does not contact the hard pavement and the ground-contact surface area of the block with respect to the hard pavement decreases, leading to deterioration in traveling performance on hard pavement.

In a fifth aspect of the present invention, in the pneumatic tire for a two-wheeled vehicle of the third or fourth aspect, a radius of curvature of the arc-shaped slightly-inclined surface is set in a range of 10-50 mm.

Next, the mechanism of the pneumatic tire for a two-wheeled vehicle according to the fifth aspect of the present invention is explained.

Further, when the radius of curvature of the arc-shaped slightly-inclined surface is less than 10 mm, a portion is created at the trailing edge side of the tread that does not contact the hard pavement and the ground-contact surface area of the block tread with respect to the hard pavement decreases, leading to deterioration in traveling performance on hard pavement.

On the other hand, when the radius of curvature of the arc-shaped slightly-inclined surface is more than 50 mm, it is not possible to delay the timing at which the block tread separates from the road surface on hard pavement, and the grip sensation and grounding sensation on hard pavement cannot be increased.

In a sixth aspect of the present invention, in the pneumatic tire for a two-wheeled vehicle of any one of the first to fifth aspects, a tapered surface, which gradually inclines toward the leading side from a base portion of the chamfered block to a central portion thereof in a height direction, is formed at a block side wall surface at the trailing side of the chamfered block and a reverse taper surface, which gradually inclines toward the trailing side of the block tread (from the central portion in the tire radial direction) to the trailing edge of the block tread, is formed at the block tread side of the tapered surface (at the block side wall surface close to the block tread side than the tapered surface).

Next, the mechanism of the pneumatic tire for a two-wheeled vehicle according to the sixth aspect of the present invention is explained.

By forming a reverse taper surface that gradually inclines toward the trailing side from the central portion in the tire radial direction to the trailing edge of the block tread at the block side wall at the trailing side of the chamfered block, a sufficient edge effect can be obtained in a state in which the chamfered block is grounded on a road surface and, in addition, since the angle of the block side wall at the leading side of the tire can be set to an angle sufficient to secure block rigidity, the disadvantage of block weakness does not occur.

Further, by forming a reverse taper surface that gradually inclines toward the trailing side from the central portion in the tire radial direction to the trailing edge of the block tread at the block side wall at the trailing side of the chamfered block, the cubic capacity of the block in the vicinity of the trailing edge is increased as compared to a block that is not provided with a reverse taper surface (that is, where the block side wall at the trailing side is a tapered surface that gradually inclines toward the leading side from the block base portion to the tread), and the portion of the block constituting the increased cubic capacity reinforces the chamfered block. As a result, the block rigidity in the vicinity of the trailing edge is improved.

In a seventh aspect of the present invention, in the pneumatic tire for a two-wheeled vehicle of the sixth aspect, an angle θ of the reverse taper surface relative to a direction normal to the tread surface is set in a range of 0-10°.

Next, the mechanism of the pneumatic tire for a two-wheeled vehicle according to the seventh aspect of the present invention is explained.

When the angle θ of the reverse taper surface relative to the tire radial direction is less than 0°, it is not possible to improve the block rigidity in the vicinity of the trailing edge.

On the other hand, when the angle θ of the reverse taper surface relative to the tire radial direction is more than 10°, the edge rigidity of the trailing edge KP is reduced and curling tends to occur at the edge. As a result, both steering stability and resistance to wear are insufficient.

Advantageous Effects of Invention

Since the pneumatic tire for a two-wheeled vehicle of the present invention has the configuration described above, basic rough terrain traveling performance is secured and, at the same time, steering stability on rough terrain can be improved and steering stability on hard pavement can also be improved, which are excellent effects.

BEST MODE FOR CARRYING OUT THE INVENTION

First Exemplary Embodiment

Figure 1:
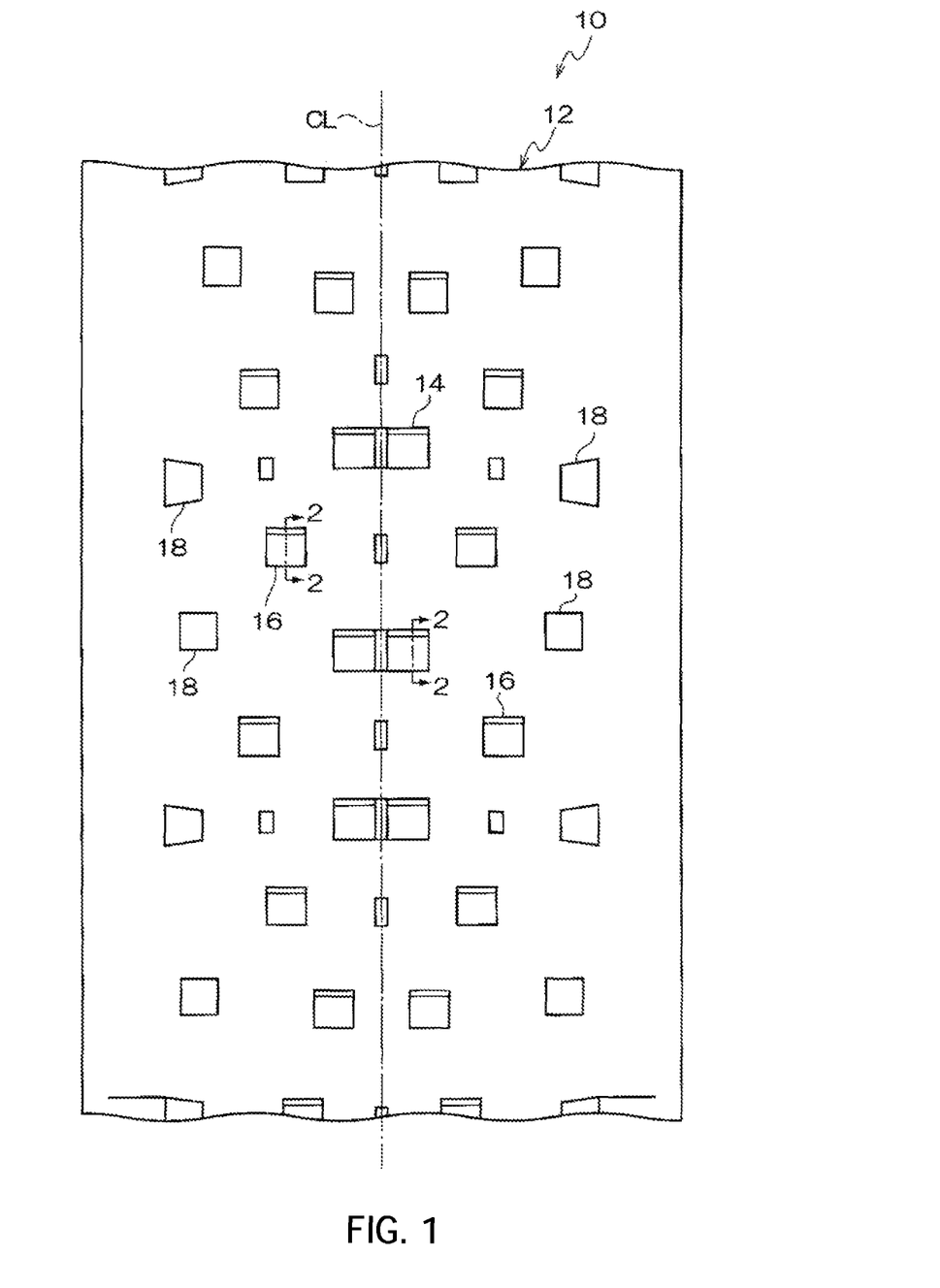
FIG. 1 shows a plan view of the tread of a pneumatic tire for a two-wheeled vehicle according to a first embodiment of the present invention.

Pneumatic tire 10 for a two-wheeled vehicle according to the first embodiment of the present invention is explained according to the drawings. FIG. 1 is a plan view of pneumatic tire 10 for a two-wheeled vehicle according to the present exemplary embodiment as seen when tread 12 is deployed in a planar shape.

As shown in FIG. 1, plural center blocks 14 (a chamfered block of the present invention), which have a rectangular shape long in the tire width direction as seen in tread plan view, are formed on tire equatorial surface CL to form a center block row, second blocks 16 (a chamfered block of the present invention), which have a substantially rectangular shape as seen in tread plan view, are disposed in a zig-zag array along the tire circumferential direction at both sides of tire equatorial surface CL to form second block rows, and shoulder blocks 18, which have a substantially rectangular shape as seen in tread plan view, are disposed in a zig-zag array along the tire circumferential direction closer to the tread edge sides than second blocks 16 to form shoulder block rows.

Shallow groove 20, which extends in the tire circumferential direction, is formed at a central portion in the width direction of center block 14. Further, the depth dimension of shallow groove 20 is smaller than the height dimension of center block 14.

Figure 2:
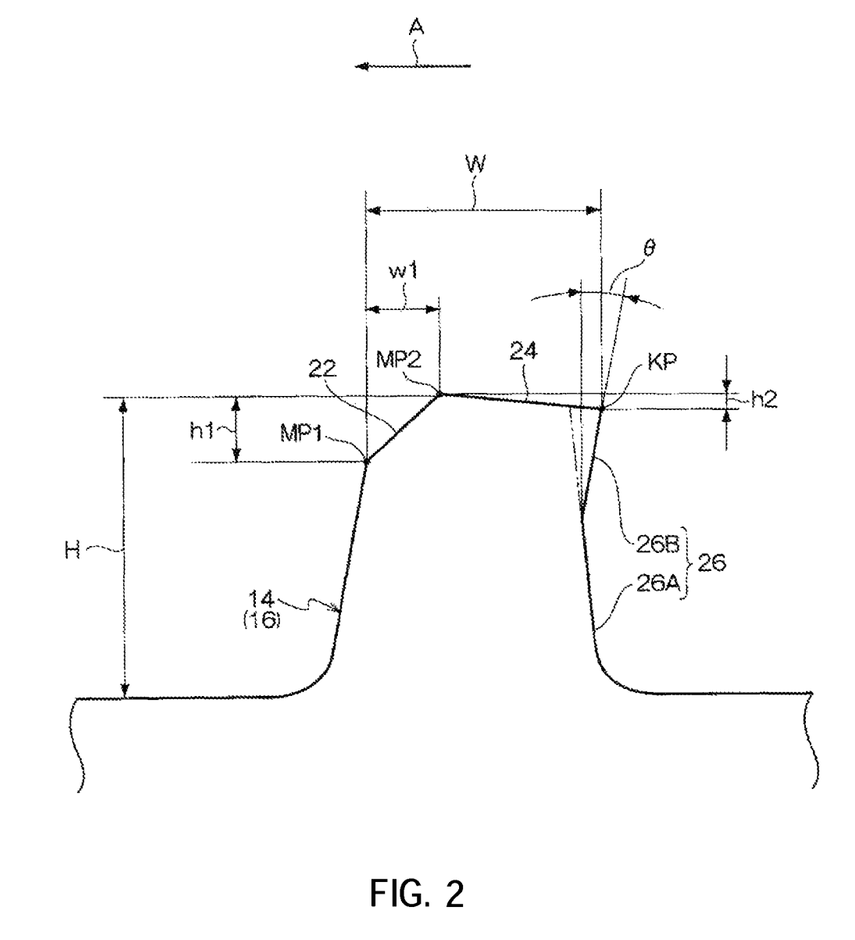
FIG. 2 shows a sectional view of a center block along a tire circumferential direction.

As shown in FIG. 2, when center block 14 is viewed in cross section along the tire circumferential direction, chamfered part 22, which is different to normal chamfers and unique to the present invention, is formed at the block tread side edge portion at the leading side (the side that contacts a road surface first when the tire rotates).

Here, when H is the height of center block 14, MP1 is the edge of chamfered part 22 at the inner side in a tire radial direction, MP2 is the edge portion of chamfered part 22 at the block tread side, h1 is the distance measured along the tire radial direction from the highest part of block tread 24 to tire radial direction inner side edge MP1 of chamfered part 22, KP is the trailing edge of block tread 24, W is the distance measured along the tire circumferential direction from MP1 to KP, and w1 is the distance measured along the tire circumferential direction from MP1 to MP2, chamfered part 22 is formed so as to satisfy h1/H=0.05 to 0.4 and w1/W=0.05 to 0.4.

Further, when center block 14 is positioned directly beneath the axis of rotation of the tire and contacts a flat hard pavement, chamfered part 22 does not contact the road surface.

In addition, when center block 14 is viewed in cross section along the tire circumferential direction, block tread 24 of center block 14 is formed overall as a slightly-inclined surface such that block height H gradually decreases from edge portion MP2 at the block tread side of chamfered part 22 toward the side of trailing edge KP. Slightly-inclined surface 24 in the present exemplary embodiment is formed in a straight line as viewed in cross section along the tire circumferential direction.

Further, when center block 14 is positioned directly beneath the axis of rotation of the tire and contacts a flat hard pavement, the entire surface of the slightly-inclined surface contacts the flat hard pavement.

Further, when h2 is the distance measured along the tire radial direction from the highest part of block tread 24 to trailing edge KP, h2/H=0.05 to 0.2 is preferably satisfied.

Portions of the side wall surfaces of center block 14 other than reverse taper surface 26B, which is described in the following, are formed in a normal tapered shape (a shape where the block tapers toward the tread).

As shown in FIG. 2, in the present exemplary embodiment, tapered surface 26A, which gradually inclines toward the leading side from the block base to a central portion thereof in the tire radial direction, is formed at block side wall surface 26 at the trailing side of center block 14, and reverse taper surface 26B, which gradually inclines toward the trailing side from the central portion in the tire radial direction to trailing edge KP of block tread 24, is formed at the block tread side of tapered surface 26A. Further, in FIG. 2, the dashed-two dotted line indicates a line extended from tapered surface 26A.

Here, the angle $\theta$ of the reverse taper surface relative to the direction normal to the tread surface is preferably set within a range of 0 to 10°.

Further, while not shown in the drawings, in the present exemplary embodiment, the sectional shape of second block 16 along the tire circumferential direction is formed in the same shape as center block 14.

Further, shoulder block 18 in the present exemplary embodiment has a sectional shape along the tire circumferential direction that is a trapezoidal shape similar to most normal blocks, and chamfered part 22 is not formed.

Mechanism

Next, the mechanism of pneumatic tire 10 for a two-wheeled vehicle of the present exemplary embodiment is explained.

Since a center block row formed from plural center blocks 14, second block rows formed from plural second blocks 16, and shoulder block rows formed from plural shoulder blocks 18 are formed at tread 12, pneumatic tire 10 for a two-wheeled vehicle of the present exemplary embodiment has basic rough terrain travel capability for traveling on rough terrain including muddy ground.

Further, because chamfered part 22 that satisfies h1/H=0.05 to 0.4 and w1/W=0.05 to 0.4 is formed at the block tread side edge portion at the leading side of center block 14 and second block 16, on muddy ground and soft pavement, resistance received from a road surface when center block 14 and second block 16 contact the road surface can be reduced, travel resistance in rough terrain can be suppressed, and steering stability in rough terrain can be improved.

Figure 3:
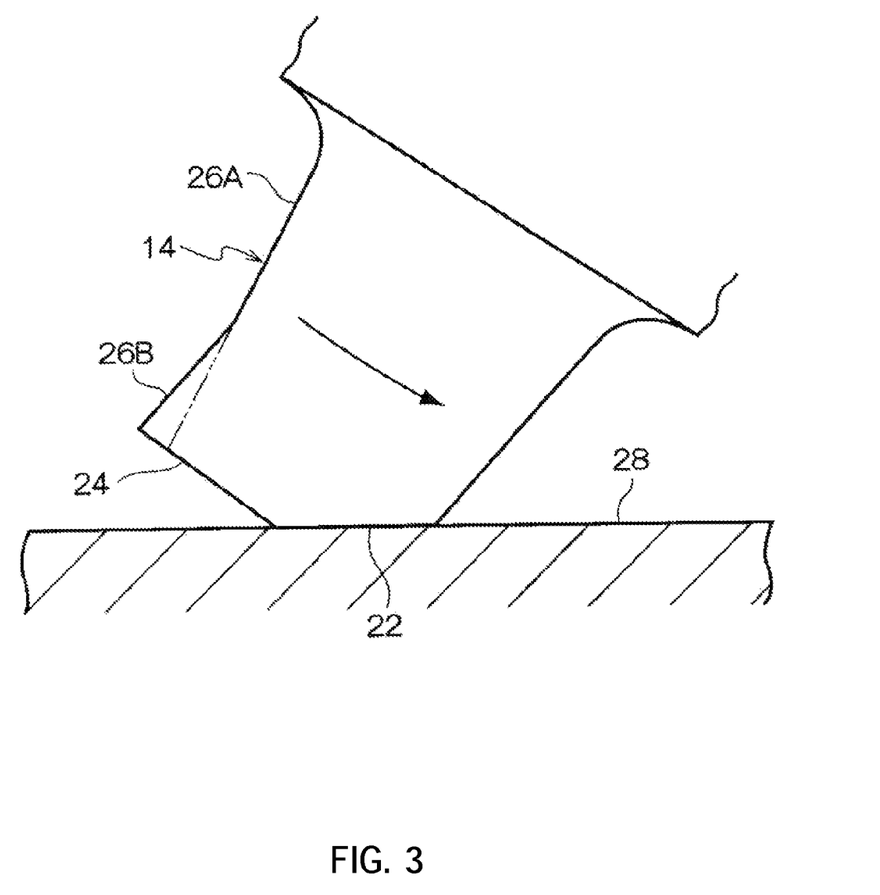
FIG. 3 shows a lateral view of a center block in a state in which a leading edge of the center block contacts a hard pavement.

Further, with center block 14 and second block 16 having chamfered part 22 that satisfies h1/H=0.05 to 0.4 and w1/W=0.05 to 0.4 formed at the block tread side edge portion at the leading side thereof, when traveling on hard pavement that is difficult to dig into such as asphalt or concrete pavement, since, as shown in FIG. 3, chamfered part 22 contacts hard pavement 28 first, the ground-contact surface area when the block contacts the ground can be increased as compared to a case in which an edge at which chamfered part 22 is not formed contacts hard pavement 28, and the grip at hard pavement 28 can be improved.

Figure 4A:
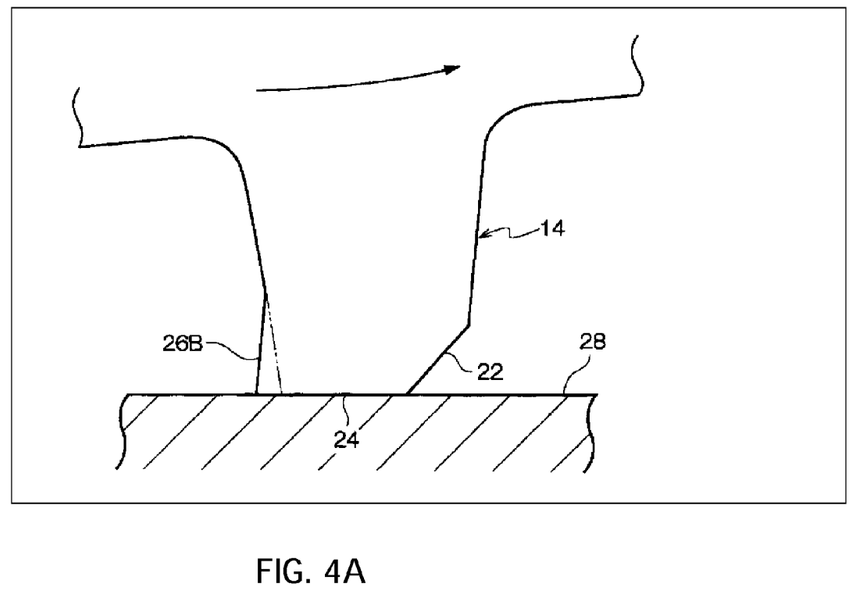
FIG. 4A shows a lateral view at a time of center block kick-off when a slightly-inclined surface is provided.
Figure 4B:
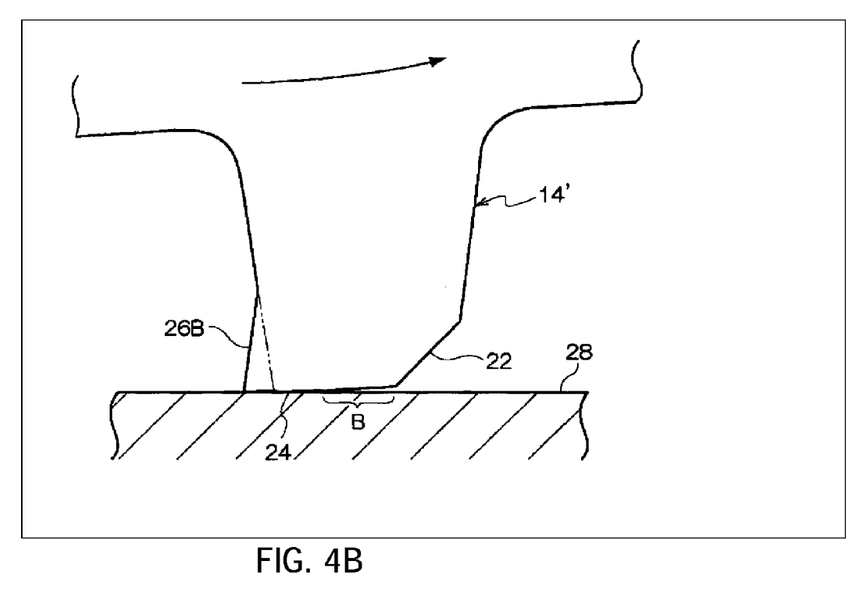
FIG. 4B shows a lateral view at a time of center block kick-off when a slightly-inclined surface is not provided.

Further, since center block 14 and second block 16 are formed with a slightly-inclined surface such that the block height of block tread 24 gradually decreases toward the trailing edge side, when traveling on hard pavement, the timing at which block tread 24 separates from the road surface is delayed as compared to a block tread that is not provided with a slightly-inclined surface (refer to FIG. 4: center block 14 in FIG. 4A has a slightly-inclined surface while center block 14' in FIG. 4B does not have a slightly-inclined surface and, as shown in FIG. 4B, region B within block tread 24 is raised from hard pavement 28), the ground-contact surface area at the time of kick-off can be increased compared to a block tread that is not provided with a slightly-inclined surface, and the grip sensation and grounding sensation can be improved.

In the present exemplary embodiment, because tapered surface 26A, which gradually inclines toward the leading side from the block base to a central portion thereof in the tire radial direction, is formed at block side wall surface 26 at the trailing side of center block 14, and reverse taper surface 26B, which gradually inclines toward the trailing side from the central portion in the tire radial direction to trailing edge KP of block tread 24, is formed at the block tread side of tapered surface 26A, the trailing edge portion of center block 14 has an acutely-angled edge as seen in sectional view along the tire circumferential direction and a sufficient edge effect can be obtained in a state in which center block 14 is grounded against the road surface. Further, by providing reverse taper surface 26B at the trailing edge side in this way, the angle of the block side wall surface at the tire leading side can be set to a sufficient angle to ensure block rigidity, as a result of which disadvantageous block weakness does not occur.

In addition, according to center block 14 of the present exemplary embodiment, by forming reverse taper surface 26B at the trailing edge side, the cubic capacity of the block in the vicinity of trailing edge KP is increased as compared with a block at which reverse taper surface 26B is not formed (a block indicated by the dashed-two dotted line), the portion of the block constituting the increased cubic capacity (the portion formed in a vertically narrow and long triangular shape having the dashed-two dotted line of FIG. 2 as one side thereof) reinforces center block 14, and the block rigidity in the vicinity of trailing edge KP is increased.

In this way, in pneumatic tire 10 for a two-wheeled vehicle of the present exemplary embodiment, a simple configuration of changing the sectional shape of a block in the tire circumferential direction has an effect whereby basic rough terrain travel performance is secured and steering stability in rough terrain is improved and, in addition, steering stability is improved on hard pavement, which is favorable for two-wheeled vehicles for both Motorcross and Enduro Racing.

Further, according to the present exemplary embodiment, since steering stability can be improved for both rough terrain and hard pavement by changing the sectional shape of the block, conventional superior block patterns can be used without any need to change the tread pattern.

In addition, in pneumatic tire 10 for a two-wheeled vehicle of the present exemplary embodiment, since there is no need to reduce the hardness of the rubber with the aim of increasing the grip, the problem of accelerated edge wear does not occur.

Further, when h1/H is less than 0.05, sufficient ground-contact surface area for chamfered part 22 that initially contacts the hard pavement cannot be secured, and the grip on hard pavement cannot be improved compared to the conventional art. Further, it becomes impossible to suppress travel resistance when traveling on rough terrain.

On the other hand, when h1/H is more than 0.4, the effect of the groove angle at the block leading side becomes larger than that at chamfered part 22. Further, in order for that surface to effectively contact the ground, it is necessary for the block to contact the ground from when it is in a location further ahead in the direction of travel than directly under the load, such that the tire radius or the yield (deflection) amount directly under the load must be increased compared to a conventional tire, which cannot be said to be an effective means for improving steering stability.

Further, when w1/W is less than 0.05, sufficient ground-contact surface area for chamfered part 22 that initially contacts the hard pavement cannot be secured, and the grip on hard pavement cannot be improved compared to the conventional art. Further, it becomes impossible to suppress travel resistance when traveling on rough terrain.

On the other hand, when w1/W is more than 0.4, it becomes impossible to secure the ground-contact surface area necessary to exhibit grip within the ground-contact surface, and the required grip cannot be obtained.

When h2/H is less than 0.05, it becomes impossible to delay the timing at which block tread 24 of center block 14 separates from the road surface on hard pavement compared with a block tread that is not inclined, and the grip sensation and grounding sensation cannot be increased.

On the other hand, when h2/H is more than 0.2, a portion is created at the side of trailing edge KP of block tread 24 that does not contact the hard pavement and the ground-contact surface area of center block 14 with respect to the hard pavement decreases, leading to deterioration in traveling performance on hard pavement.

When the angle θ of reverse taper surface 26B relative to the tire radial direction is less than 0°, it becomes impossible to improve the block rigidity in the vicinity of trailing edge KP.

On the other hand, when the angle θ of reverse taper surface 26B relative to the tire radial direction is more than 10°, the edge rigidity of trailing edge KP is reduced and curling tends to occur at the edge. As a result, both steering stability and resistance to wear are insufficient.

Figure 5:
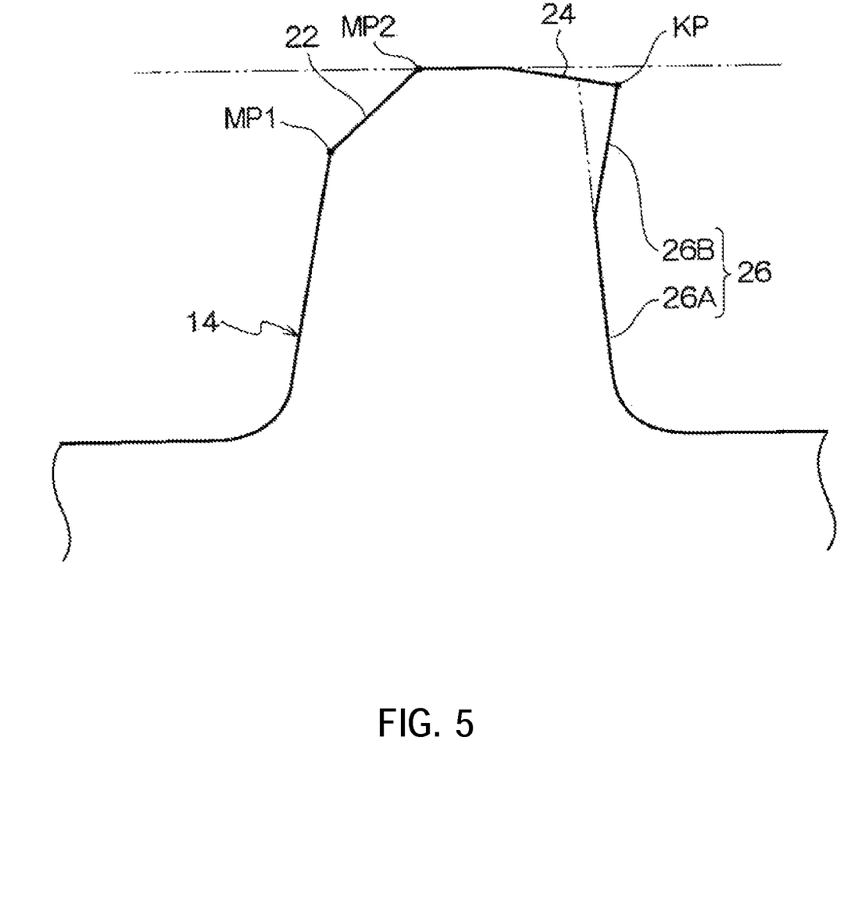
FIG. 5 shows a sectional view of a variant example of a center block.

In addition, in the present exemplary embodiment, a slightly-inclined surface that gradually decreases in height toward the trailing edge side is formed at block tread 24 from the block tread side edge portion MP2 of chamfered part 22 as far as trailing edge KP; however, the present invention is not limited to this and, in some cases, only a portion in the vicinity of trailing edge KP may be formed as a slightly-inclined surface as shown in FIG. 5, or a slightly-inclined surface may be omitted from the configuration.

Second Exemplary Embodiment

Figure 6:
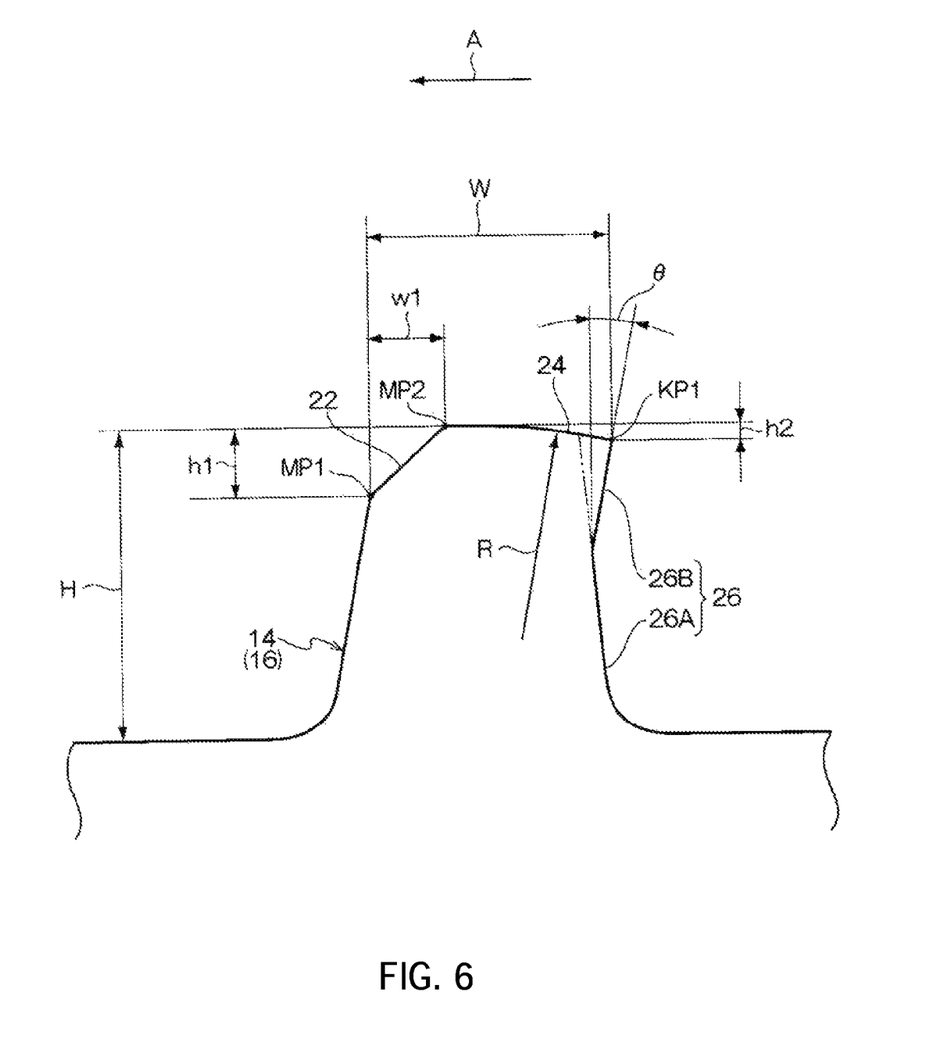
FIG. 6 shows a sectional view of a center block of a pneumatic tire for a two-wheeled vehicle according to a second embodiment of the present invention.

Next, pneumatic tire 10 for a two-wheeled vehicle according to a second exemplary embodiment of the present invention is explained according to FIG. 6. Further, identical configuration to the first embodiment is provided with the same reference numerals and explanation thereof is omitted.

As shown in FIG. 6, the slightly-inclined surface of center block 14 of the present exemplary embodiment (the same applies for second block 16, which is not shown in the drawings) has an arc shape that is convex toward the outer side in the tire radial direction as seen in sectional view along the tire circumferential direction. When the sectional shape of the slightly-inclined surface is an arc shape, the radius of curvature R thereof is preferably set within the range of 10 to 50 mm.

By providing the slightly-inclined surface with an arc shape that is convex toward the outer side in the tire radial direction as in the present exemplary embodiment, there are no sudden changes in the grounding pressure of block tread 24 along the circumferential direction, which is a preferable embodiment in terms of tread shape.

Further, when the radius of curvature R of the arc-shaped slightly-inclined surface is less than 10 mm, a portion is created at the trailing edge side of block tread 24 that does not contact the hard pavement and the ground-contact surface area of block tread 24 with respect to the hard pavement decreases, leading to deterioration in traveling performance on hard pavement.

On the other hand, when the radius of curvature R of the arc-shaped slightly-inclined surface is more than 50 mm, it is not possible to delay the timing at which block tread 24 of center block 14 separates from the road surface on hard pavement, and the grip sensation and grounding sensation cannot be increased.

Other Exemplary Embodiments

In the above exemplary embodiments, chamfered part 22 is not formed at shoulder block 18; however, chamfered part 22, the slightly-inclined surface, and reverse taper surface 26B may be formed at shoulder block 18 similarly to center block 14.

EXAMPLES

In order to ascertain the effect of the present invention, a conventional example of a pneumatic tire for a two-wheeled vehicle and an example of a pneumatic tire for a two-wheeled vehicle to which the present invention had been applied were prepared, and evaluation was performed using an actual vehicle.

Conventional example: tread provided with normal blocks having an overall trapezoidal shape in lateral view and at which a chamfered part is not formed at the leading side. Soft tire without any prescribed direction of rotation.

Present example: as in the second exemplary embodiment, the block has a chamfered part formed at the leading side, the block tread exhibits an arc shape, and a reverse taper surface is formed at the block side wall at the trailing side. w1/W=0.16, h1/H=0.07, the radius of curvature R of the slightly-inclined surface=25 mm, and angle θ of the reverse taper surface=5°.

Further, other specifications are as described below.

Negative rate (camber): 80%

Block height: 14 mm

Designation of tire size: 80/100

Tire inch radius: 21 inches

Rim for actual vehicle test: 1.60×21

Internal pressure used for actual vehicle test: 80 kPa

In the test, both a bias tire and a radial tire were prepared for each of the conventional example and the present example, as indicated in the table below.

Bias configuration: carcass formed from two layers of ply including nylon cords (angle of cords relative to circumferential direction: 30°. Further, one cap layer including nylon cords provided.

Radial configuration: carcass formed from one layer of ply including nylon cords (angle of cords relative to circumferential direction: 90°. Further, spiral belt having aromatic polyamide cords wound in a spiral (MSB) provided.

TABLE 1

|  | Bias tire | Radial tire |
| --- | --- | --- |
| Conventional example | Test type 1 | Test type 3 |
| Present example | Test type 2 | Test type 4 |

The testing constituted an on-vehicle evaluation was conducted by a professional rider on rough terrain. The result of the testing is indicated in Table 2 below. Further, the evaluation was conducted on a scale of one to ten with a higher number indicating a more favorable result.

TABLE 2

|  | Grip sensation | Grounding sensation | Rigidity sensation | Slip control |
|---|---|---|---|---|
| Test type 1 | 5 | 5 | 5 | 5 |
| Test type 2 | 7 | 8 | 7 | 8 |
| Test type 3 | 6 | 7 | 6 | 7 |
| Test type 4 | 8 | 9 | 7 | 9 |

The testing showed that the tire of the present example having the present invention applied thereto was improved with respect to performance in every aspect as compared to the tire of the conventional example, regardless of the tire configuration.

The invention claimed is:

1. A pneumatic tire for a two-wheeled vehicle, comprising a plurality of blocks provided on a tread, wherein:

the plurality of blocks includes a chamfered block that has a chamfered part formed at a block tread side edge portion at a leading side and that satisfies h1/H = 0.05 to 0.4 and w1/W = 0.05 to 0.4 when H is block height, MP1 is an edge of the chamfered part at an inner side in a tire radial direction, MP2 is an edge portion of the chamfered part at the block tread side, h1 is a distance measured along a direction normal to the tread surface from a highest part of the block tread to the tire radial direction inner side edge MP1 of the chamfered part, KP is a trailing edge of the block tread, W is a distance measured along a tire circumferential direction from the tire radial direction inner side edge MP1 to the trailing edge KP, and w1 is the distance measured along the tire circumferential direction from the tire radial direction inner side edge MP1 to the block tread side edge portion MP2, wherein:

a tapered surface, which gradually inclines toward the leading side from a base portion of the chamfered block toward a central portion thereof in a height direction, is formed at a block side wall surface at the trailing side of the chamfered block;

a reverse taper surface which gradually inclines toward the trailing side of the block tread, is formed at the block tread side of the tapered surface, and the tapered surface and the reversed tapered surface each only include a single tapered surface formed at each block side wall surface in the tire radial direction.

2. The pneumatic tire for a two-wheeled vehicle of claim 1, wherein:

the block tread of the chamfered block includes a slightly-inclined surface whereby the block height gradually decreases toward the trailing edge side; and when the chamfered block is positioned directly under an axis of tire rotation and contacts a flat road surface, an entire surface of the slightly-inclined surface contacts the flat road surface.

3. The pneumatic tire for a two-wheeled vehicle of claim 2, wherein the slightly-inclined surface has an arc shape that is convex toward an outer side in the tire radial direction as seen in sectional view along the block circumferential direction.

4. The pneumatic tire for a two-wheeled vehicle of claim 2, wherein h2/H = 0.05 to 0.2 when h2 is a distance measured along a direction normal to the tread surface from the highest part of the block tread to the trailing edge KP.

5. The pneumatic tire for a two-wheeled vehicle of claim 3, wherein a radius of curvature of the arc-shaped slightly-inclined surface is set in a range of 10-50 mm.

6. The pneumatic tire for a two-wheeled vehicle of claim 1, wherein an angle $\theta$ of the reverse taper surface relative to a direction normal to the tread surface is set in a range of 0 to 10°.

* * * * *